US 6,715,665 B2

(12) United States Patent
Hirano et al.

(10) Patent No.: US 6,715,665 B2
(45) Date of Patent: Apr. 6, 2004

(54) FRICTION STIR WELDING METHOD AND APPARATUS, AND WELDED STRUCTURE

(75) Inventors: Satoshi Hirano, Hitachi (JP); Hisanori Okamura, Tokai (JP); Yasuhisa Aono, Hitachi (JP); Kazutaka Okamoto, Hitachi (JP); Kinya Aota, Hitachi (JP); Tomio Odakura, Hitachi (JP); Shinichi Hasshuu, Suifu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/342,305

(22) Filed: Jan. 15, 2003

(65) Prior Publication Data

US 2003/0098337 A1 May 29, 2003

Related U.S. Application Data

(63) Continuation of application No. 09/939,654, filed on Aug. 28, 2001, now Pat. No. 6,540,128.

(30) Foreign Application Priority Data

Apr. 4, 2001 (JP) ........................................ 2001-106180

(51) Int. Cl.[7] .............................................. B23K 20/12
(52) U.S. Cl. .................................................... 228/112.1
(58) Field of Search ............................... 228/112.1, 2.1, 228/44.3, 212

(56) References Cited

U.S. PATENT DOCUMENTS 6,325,273 B1 * 12/2001 Boon et al. ............... 228/112.1
6,419,142 B1 * 7/2002 Larsson ...................... 228/2.1
6,421,578 B1 * 7/2002 Adams et al. .............. 700/212
6,450,395 B1 * 9/2002 Weeks et al. ............. 228/112.1

FOREIGN PATENT DOCUMENTS

| JP | 2712838 | 10/1997 |
| JP | 10-180467 | 7/1998 |
| JP | 10-249552 | 9/1998 |
| JP | 2000-135575 | 5/2000 |

* cited by examiner

Primary Examiner—Tom Dunn
Assistant Examiner—Jonathan Johnson
(74) Attorney, Agent, or Firm—Dickstein Shapiro Morin & Oshinsky LLP

(57) ABSTRACT

It is an object of the present invention to provide a friction stir welding method and apparatus capable of maintaining a rotating tool and workpieces at a substantially constant geometrical relation for arbitrary curved surfaces having a three-dimensional shape, as well as a welded structure obtained thereby.

The present invention resides in a friction stir welding method comprising joining workpieces while setting rotational angles of two rotational axes of a rotating tool which the two rotational axes are rotatable in intersecting directions or perpendicularly intersecting directions independently of rotation of the rotating tool, detecting a normal line direction with respect to joint surfaces of the workpieces and a tangential direction of a joint line, and joining the workpieces in three-dimensional directions while setting, on the basis of the detected normal line direction and tangential direction, an angle relative to a normal line direction, as well as a tangential direction, at a tip end of the rotating tool, and also resides in a friction stir welding apparatus using the said method.

6 Claims, 6 Drawing Sheets

FRICTION STIR WELDING METHOD AND APPARATUS, AND WELDED STRUCTURE

This is a continuation of U.S. patent application Ser. No. 09/939,654, filed Aug. 28, 2001, now U.S. Pat. No. 6,540,128, the entire disclosure of which is incorporated herein by reference.

BACKGROUND OF THE INVENTION

1. Field of the Invention

The present invention relates to a novel friction stir welding method and apparatus, as well as a welded structure obtained thereby. Particularly, the invention is concerned with a method and apparatus suitable for joining plural workpieces in a complicated three-dimensional shape.

2. Description of the Prior Art

In Japanese Patent No. 2712838 (WO93/10935) is disclosed a friction stir welding method wherein a metallic rod (hereinafter referred to as "rotating tool"), which is substantially harder than the material of workpieces, is inserted into a joint region of the workpieces and is moved under rotation, and the workpieces are joined together with a frictional heat generated between the rotating tool and the workpieces. This friction stir welding method utilizes a plastic flow phenomenon induced with rotation of the rotating tool in which the workpieces are softened with a frictional heat developed between the workpieces and the rotating tool. It is based on a principle different from a principle of a method (e.g., arc welding) in which workpieces are melted and welded thereby.

As apparatus for practicing the friction stir welding method in question there are known, for example, those disclosed in Japanese Patent Laid-Open Nos. Hei 10-249552 and Hei 10-180467. The apparatus disclosed in Japanese Patent Laid-Open No. Hei 10-249552 is for joining such flat plate-like members as shown in FIGS. 3 and 4, and the apparatus disclosed in Japanese Patent Laid-Open No. Hei 10-180467 is for joining such cylindrical members as shown in FIG. 5.

These prior art apparatus are the same in that the rotating tool and the workpieces move relatively while maintaining a certain geometrical relation during welding, although both are different in that the workpieces used in the former are such flat plate-like ones as shown in FIGS. 3 and 4, while the workpieces used in the latter are such cylindrical ones having curvature as shown in FIG. 5. Thus, no special operation is needed during welding if only a geometrical relation between the rotating tool and the workpieces is set beforehand.

However, with a relative movement between the rotating tool and the workpieces, the geometrical relation between the two may change during welding. FIG. 6 shows an example of such a change. As illustrated therein, such a change occurs in the case where a joint line is formed by a combination of a straight line and circular arcs. In this case, it is necessary to take some measure for maintaining the geometrical relation between the rotating tool and the workpieces.

On the other hand, in Japanese Patent Laid-Open No. 2000-135575 is disclosed a structure wherein a rotating tool support member with a rotating tool attached thereto in an inclined state is rotatable about an axis which is perpendicular to the surfaces of workpieces. According to this structure, for joining workpieces in such a form as typified by FIG. 6, it is possible to maintain a geometrical relation between a rotating tool and workpieces.

In a friction stir welding method, a geometrical relation between a rotating tool and workpieces is important in ensuring the soundness of a joint region. More particularly, as shown in FIG. 7, if the rotating tool is tilted at an angle of θ ("attack angle" hereinafter) so that a lower end thereof precedes in a welding direction with respect to the surfaces of the workpieces, it becomes easier to ensure the soundness of the joint region.

A problem found in Japanese Patent Laid-Open No. 2000-135575 is that workpieces can be joined together if they are flat plate-like, i.e., if the surfaces to be joined are flat surfaces, but that arbitrary curved surfaces having a three-dimensional shape cannot be joined.

FIG. 8 is a conceptual diagram of the technique proposed in Japanese Patent Laid-Open No. 2000-135575. In the same figure, a rotating tool 11 is rotated by means of a motor 21 via a rotating tool support member 22. The, rotating tool support member 22 is supported by a rotary cylinder 23.

FIG. 9 illustrates, in terms of trigonometry, a workpieces joining operation using an apparatus of the configuration shown in FIG. 8, in which workpieces are joined counter-clockwise from A to B along a joint line which is rectangular. As welding advances from A to B, the welding direction changes 90°.

At this time, if the welding direction alone is changed in a fixed state of a rotational axis of the rotating tool, the relation between the workpieces and the rotating tool attack angle θ changes into a positional relation which is no longer a proper relation. In this case, if the rotary cylinder 23 is rotated 90°, a rotational axis of the rotating tool support member 22 rotates 90° about an axis perpendicular to the workpieces. Since the rotational axis of the rotating tool support member 22 and that of the rotary cylinder 23 define an angle corresponding to the rotating tool attack angle θ, the relation between the workpieces and the attack angle θ is maintained.

Thus, according to the configuration of the apparatus described above, the rotational axis of the rotating tool, which is tilted at a predetermined certain angle relative to an axis perpendicular to the workpieces, is rotated about the axis perpendicular to the workpieces, thereby making it possible to maintain the relation between the workpieces and the attack angle θ of the rotating tool even when the welding direction changes.

Of importance is that the angle of the axis perpendicular to the workpieces is constant and that the rotational axis of the rotary cylinder 23 is coincident with the axis perpendicular to the workpieces. In other words, according to the configuration of the apparatus described above, the inclination of the rotational axis of the rotary cylinder 23 cannot be altered and therefore it is necessary that the angle of the axis perpendicular to the workpieces be constant. The axis perpendicular to the workpieces indicates a normal line with respect to the surfaces to be joined, or the joint surfaces, and it is only the case where the joint surfaces are flat surfaces that the normal line is constant. If the joint surfaces are arbitrary curved surfaces in a three-dimensional shape, the direction of the normal line is not constant. Thus, according to the foregoing prior art structure it is impossible to join curved surfaces of a three-dimensional shape.

SUMMARY OF THE INVENTION

It is an object of the present invention to provide a friction stir welding method and apparatus capable of maintaining a geometrical relation between a rotating tool and workpieces for arbitrary curved surfaces having a three-dimensional shape, as well as a jointed structure obtained thereby.

According to the present invention there is provided a friction stir welding method of joining workpieces by pushing a rotating tool into the workpieces under rotation of the rotating tool and moving the rotating tool along a joint line, characterized in that the workpieces are joined together while setting a posture of the rotating tool to be pushed into the workpieces with use of both a member having the same rotational axis as a rotational axis of the rotating tool and capable of rotating independently of the rotation of the rotating tool and a member capable of deflecting the rotational axis of the rotating tool about an axis which intersects or perpendicularly intersects the rotational axis of the rotating tool.

According to the present invention there is provided a friction stir welding method of joining workpieces by pushing a rotating tool into the workpieces under rotation of the rotating tool and moving the rotating tool along a joint line, characterized in that the rotating tool has two rotational axes capable of rotating independently of the rotation of the rotating tool, one of said rotational axes being the same as a rotational axis of the rotating tool and rotatable in both the rotating direction of the rotating tool and the direction opposite thereto, the other rotational axis being rotatable in a direction intersecting or perpendicularly intersecting said one rotational axis, the workpieces are joined together while setting rotational angles of said two rotational axes with respect to said rotating tool, a normal line direction with respect to joint surfaces of the workpieces and a tangential direction of the joint line are detected, and the rotating tool is moved in three-dimensional directions to join the workpieces while setting, on the basis of the detected normal line direction and tangential direction, an angle of a tip end of the rotating tool with respect to the normal line direction or an angle at which the rotating tool is pushed into the workpieces, as well as a moving direction of the rotating tool with respect to the tangential direction.

According to this method, as is seen from the above, the tip end of the rotating tool can be set to any of all angles and positions in three dimensions, so if a normal line direction of a joint region and a tangential direction of the joint line are calculated from the shape of workpieces, then from the thus-calculated normal line direction and tangential direction it is possible to properly set a normal line direction and a welding direction of the rotational axis at the tip end of the rotating tool.

In a friction stir welding method, as noted earlier, a geometrical relation between the rotating tool and the workpieces is important in ensuring the soundness of the joint region. In a simple joint form such as that wherein joint surfaces of workpieces are flat surfaces and a joint line is a straight line, the soundness of the joint region can be ensured easily by tilting the angle θ (see FIG. 6) so that the lower end of the rotating tool precedes in the welding direction with respect to the surfaces of the workpieces. The angle θ is set with respect to a direction perpendicular to the workpieces. It is preferable that the angle θ be within 10 degrees.

However, in the case of an arbitrary curved surface having a three-dimensional shape, the direction ("normal line direction" hereinafter) perpendicular to joint surfaces and the welding direction vary with place. Having made studies about a method for obtaining a proper geometrical relation for an arbitrary curved surface, the present inventors reaches the conclusion that it is most effective to determine the geometrical relation on the basis of both normal line direction and tangential direction of the joint line (merely "tangential direction" hereinafter).

It is important that both normal line direction and tangential direction be referred to. There are innumerable directions around the normal line which directions each have a certain angle relative to the normal line direction. Therefore, if a tangential direction of the joint line is unknown, it is impossible to determine a specific direction. In a special case where the attack angle is 0°, it suffices to make the rotational axis of the rotating tool coincident with the normal line, but in this case there is a fear that the soundness of the joint region may be deteriorated.

According to the present invention, a coordinate value of a joint line is predetermined from the shape of workpieces, the workpieces are joined together on the basis of the predetermined joint line coordinates, while a positional change of the joint line during welding is detected and a positional relation between the rotating tool and the workpieces is amended successively on the basis of the detected value.

It is also basically possible to joint workpieces while detecting a joint line with use of a sensor. However, in the method of bonding workpieces while successively calculating a normal line direction with respect to joint surfaces and a tangential direction with respect to a joint line on the basis of signals provided from the sensor, the calculation load becomes large. Further, since the workpieces are deformed by pushing of the rotating tool against them, it is possible that a contour different from an initial shape of the workpieces will be detected. Consequently, the coordinates to be referenced to become vague and hence there is a fear that the rotating tool may be pushed in to an excess or conversely it may be pushed in too little.

Studies made by the present inventors have shown that the displacement of workpieces from their initial shape is small and can be corrected by successive amendments during welding.

For the reasons stated above we have found out that it is the simplest welding method to determine a coordinate value (initial value) of a joint line beforehand and then amend the initial value.

Further, according to the present invention, the foregoing problems are solved by detecting a positional change of a joint line during welding at a position which precedes in the advancing direction of the rotating tool. The detection of a positional change of the joint line is basically possible even just after passing of the rotating tool, i.e., even behind the rotating tool in the tool advancing direction, if the detecting position is near the detecting tool. However, in the case where the detection is made behind the rotating tool, the surface roughness of the joint region is large and therefore, particularly in the case of using an optical type of a sensor, the value detected by the sensor may become unstable. Thus, it is effective to detect a positional change of the joint line at a position which precedes in the advancing direction of the rotating tool.

Also, according to the present invention, the foregoing problems are solved by determining a groove portion defined by workpieces or edge portions at ends of workpieces from a sensor output and, on the basis of the groove portion or the edge portions, determining in what amount the position of the rotating tool is to be amended in the joint line width direction.

Most of deformations of workpieces during joining of the workpieces are caused by pushing-in of the rotating tool and therefore the amendment of the rotating tool position is also made mainly in the direction in which the rotating tool is pushed in. However, the joint line position changes also in the width direction of the joint line for each material of workpieces, which is attributable to the difference in dimensional accuracy of to-be-joined members. A large deviation between the joint line and the rotating tool axis in the width direction would result in deteriorated soundness of the joint region. This occurs in butt welding and is marked in the case of a large groove gap. Thus, for ensuring the soundness of the joint region it is important that the joint line and the rotating tool axis be drawn as close as possible to each other in the width direction.

Workpieces are usually chamfered at their edge portions, so even when both are abutted against each other without leaving any clearance, a small gap is present in the abutted region. Even such a small gap can be recognized by a sensor capable of detecting a fine region, such as a laser displacement meter, thus making it possible to establish a criterion for an off-axis condition in the width direction.

On the other hand, in lap welding (FIG. 3), it is difficult to directly recognize a joint line because joint surfaces are flat surfaces. However, end edges of workpieces are located away from the joint line, so with the edges as reference, it is possible to specify the position of the joint line.

According to the present invention there is provided a friction stir welding apparatus comprising a rotating tool, a rotating tool drive means which causes the rotating tool to rotate through a transfer member, and a bending drive means which causes the rotating tool to bend through a rotational axis bending member without changing the angle of a rotational axis of the transfer member, and a rotation drive means which causes the rotational axis bending member to rotate through a pivoting member which can rotate independently of the rotation of the rotating tool.

According to the present invention, the foregoing problems are solved by a friction stir welding apparatus wherein a rotating tool is pushed into workpieces under rotation of the rotating tool and is moved along a joint line while it is rotated, to join the workpieces, the friction stir welding apparatus comprising a rotational axis bending member for bending a tip end portion of a rotational axis in an arbitrary amount in a route of a rotating portion from a rotating tool drive unit up to a tip end of the rotating tool, and a pivoting member capable of rotating about a rotational axis in an unbent region from the rotating tool drive unit up to the bending member and capable of stopping at a desired rotational angle.

In the above configuration, the rotational axis bending member functions to tilt the rotational axis of the rotating tool in a normal line direction with respect to joint surfaces or in a direction with an attack angle added to the normal line, while the pivoting member functions to make switching into a tangential direction with respect to the welding direction. Under such functions of the two members, the rotational axis direction of the rotating tool and the workpieces can be kept in proper conditions constantly for arbitrary curved surfaces.

According to the present invention, the foregoing problems are solved by a friction stir welding apparatus comprising a bending drive member which causes a bending quantity to be changed for the rotational axis bending member and a pivoting drive member which causes a pivoting quantity to be changed for the pivoting member. The rotation and pivoting referred to above can be done manually, but in the case of manual operation, a problem arises not only in point of stability, which is low, but also in point of safety. Therefore, the provision of a drive members is preferred in practical use. The use of a drive member is effective in ensuring a high quality of the joint region and also effective in reducing the number of workers because the drive member can be automated in combination with electronic control.

The drive member is not specially limited insofar as it can generate a rotating power. But the use of a motor is most suitable. Above all, a servo motor which can control the amount of rotation with a high accuracy is suitable. Since a rotational speed in bending or pivoting of several revolutions per second suffices, there may be used a small-sized motor in combination with a reduction mechanism having a large reduction ratio.

According to the present invention there is provided a friction stir welding apparatus comprising a rotating tool, a rotating tool drive means which drives the rotating tool through a transfer member, a first arm which supports the transfer member rotatably at one end thereof, a second arm which supports an opposite end of the first arm rotatably at one end thereof, a support base which supports an opposite end of the second arm rotatably, the transfer member and the first arm, the first arm and the second arm, and the second arm and the support base being respectively connected by parallel link means, the rotation of the transfer member, the rotation of the first arm, and the rotation of the second arm being each conducted by operation of a servo motor through a ball screw, and further comprising the foregoing bending drive member, pivoting member and their drive means.

Thus, according to the present invention, the foregoing problems are solved by a friction stir welding apparatus wherein the means for changing the position of the rotating tool comprises arm-like members of a parallel link structure and the operation of each of the arm-like members is performed by means of a ball screw which is rotated with a servo motor.

In friction stir welding, it is necessary to control the push-in quantity of the rotating tool to a value of the order of 1/10 mm at the same time when the rotating tool is pushed into workpieces with a force of several hundred to several thousand kilograms (a high-load high-accuracy operation). Welding robots or the like which are currently popular are generally 100 kg or less in terms of a transportable load at a tip end of an arm and are thus not applicable to friction stir welding. Welding robots or the like are generally of a structure wherein a drive motor is mounted directly to a link pin of an arm, and the arm is actuated with the torque of the motor itself. According to this structure, the use of a large-sized motor is needed for increasing the transportable load of the arm. Thus the size of the equipment is increased.

On the other hand, as a structure for realizing a large transportable load, there is known a parallel link structure which is used in construction machines for example. In a construction machine, an arm is actuated with a hydraulic cylinder. With a hydraulic cylinder, however, there is not obtained a satisfactory operation accuracy.

According to the present invention, a high load is realized by adopting a parallel link structure and a high-accuracy operation can be effected by rotating a ball screw with a servo motor, thus permitting both high load and high-accuracy operation to be attained at a time.

According to the present invention there is provided a friction stir welding apparatus comprising a rotating tool, a rotating tool drive means for rotating the rotating tool through a transfer member, a bending drive means which causes the rotating tool to bend through a rotational axis bending member without changing the angle of a rotational axis of the transfer member, a pivoting drive means which causes the rotational axis bending member and the bending drive means to rotate through a pivoting member, the pivoting member having the same rotational axis as a rotational axis of the rotating member and being rotatable independently of the rotation of the rotating tool, a first arm which holds the pivoting member at a fulcrum, a drive means for vertically actuating the fulcrum side of the first arm, a second arm which supports the first arm, a drive means which vertically actuates the first arm side of the second arm, a support base for fixing thereto of the second arm, and a rotary table which supports the support base rotatably on an apparatus base.

Thus, according to the present invention, the foregoing problems are solved by providing a rotational axis bending member and a pivoting member for an arm-like member. With an arm structure, it is possible to attain the reduction of size in comparison with an apparatus constituted by a linear moving axis. By providing a rotational axis bending member and a pivoting member in the arm structure it is possible to afford a friction stir welding apparatus of a more compact structure capable of joining arbitrary curved surfaces.

According to the present invention there is provided a friction stir welding apparatus comprising a rotating tool, a rotating tool drive means which causes the rotating tool to rotate through a transfer member, a bending drive means which causes the rotating tool to bend through a rotational axis bending member without changing the angle of a rotational axis of the transfer member, a pivoting drive means which causes the rotational axis bending member and the bending drive means to rotate through a pivoting member, the pivoting member having the same rotational axis as a rotational axis of the rotating tool and being capable of rotating independently of the rotation of the rotating tool, a drive means which causes the pivoting member to pivot about a fulcrum provided in the pivoting member, a first holding means for holding the pivoting member, a second holding member for holding the first holding member vertically movably, a column which holds the second holding member, a base which holds the column horizontally movably, and a workpiece mount installed on the base and movable horizontally in a direction different 90° from a moving direction of the column.

Thus, according to the present invention, the foregoing problems are solved by a friction stir welding apparatus including three moving means provided on a table with three axes orthogonal to one another as moving axes, and wherein the pivoting member and the rotational axis bending member are movable in association with one of the three moving means. The three moving means cause the tip end of the rotating tool to move to a desired position of workpieces and the pivoting member and the rotational axis bending member function to keep the rotational axis of the rotating tool proper. With the above configuration, therefore, it is possible to join arbitrary curved surfaces.

According to the present invention, the foregoing problems are solved by using a sensor of the type having a wide measurement range in the width direction of the joint region as a sensor for measuring the distance between workpieces and the rotating tool. As noted previously, for ensuring the soundness of the joint region it is important that the joint line and the axis of the rotating tool be drawn as close as possible in the width direction. The use of a sensor is needed in specifying a joint line position. Various sensors are available, including stylus sensor, spin sensor, and laser displacement meter. For detecting the shape of such a fine region as the recess formed in the abutted region, the spin sensor is unsuitable, while the stylus sensor and the laser displacement meter are suitable. However, even with use of such stylus sensor or laser displacement meter, it is still insufficient to detect the recess in the abutted region. It is necessary that the sensor used be scanned in the width direction of the joint line. There is known a method wherein the sensor itself is reciprocated mechanically. But it is substantially difficult to make an instantaneous measurement in the width direction with advance of welding. Thus, it is most practical to use a sensor of the type having a wide measurement range in the width direction of the joint region.

According to the present invention, the foregoing problems are solved by using an arithmetic unit which calculates a movement quantity of the rotating tool in accordance with the shape of workpieces and a control unit which controls the movement quantity of the rotating tool. For amending the positional relation between workpieces and the rotating tool successively during welding, it is necessary to calculate to what degree the positional relation is to be amended. It is effective and economical to use such an arithmetic unit as typified by a microcomputer which is popular at present. It is also effective and economical to control the thus-calculated amendment quantity by means of a control unit with a microcomputer installed therein.

According to the present invention, by using a rotating tool having two rotational axes rotatably in orthogonal directions different 90° from each other, it is possible to easily set a normal line direction of a joint region and a tangential direction of a joint line from the shape of workpieces, whereby all curved surfaces in three dimensions can be joined. Besides, if those two directions—normal line direction and tangential direction—are detected with use of a sensor, it is possible to determine a rotational axis direction at the tip end of the rotating tool and therefore arbitrary curved surfaces of a three-dimensional shape can be joined while maintaining the rotating tool and the workpieces always in a proper geometrical relation.

Moreover, since the friction stir welding apparatus according to the present invention is provided with a rotational axis bending member for bending a rotational axis in an arbitrary amount in the rotating section from a rotating tool drive unit up to the tip end of the rotating tool and is also provided with a pivoting member which is rotatable about a rotational axis in an unbent region from the rotating tool drive unit up to the bending member and which can stop at a desired rotational angle, even in the case of workpieces having curved surfaces of a three-dimensional shape, the rotating tool and the workpieces can be arranged in an appropriate geometrical relation.

Further, since the means for changing the position of the rotating tool is constituted by an arm-like member of a parallel link structure and the arm-like member is actuated by a ball screw which is rotated by a servo motor, both a large rotating tool push-in load and a highly accurate rotating tool position control can be realized with compact equipment.

Thus, according to the present invention, for arbitrary curved surfaces of a three-dimensional shape it is possible to realize, with compact equipment, a large rotating tool push-in load and a highly accurate rotating tool position control.

DESCRIOPTION OF THE PREFERRED EMBODIMENT (First Embodiment)

Figure 1:
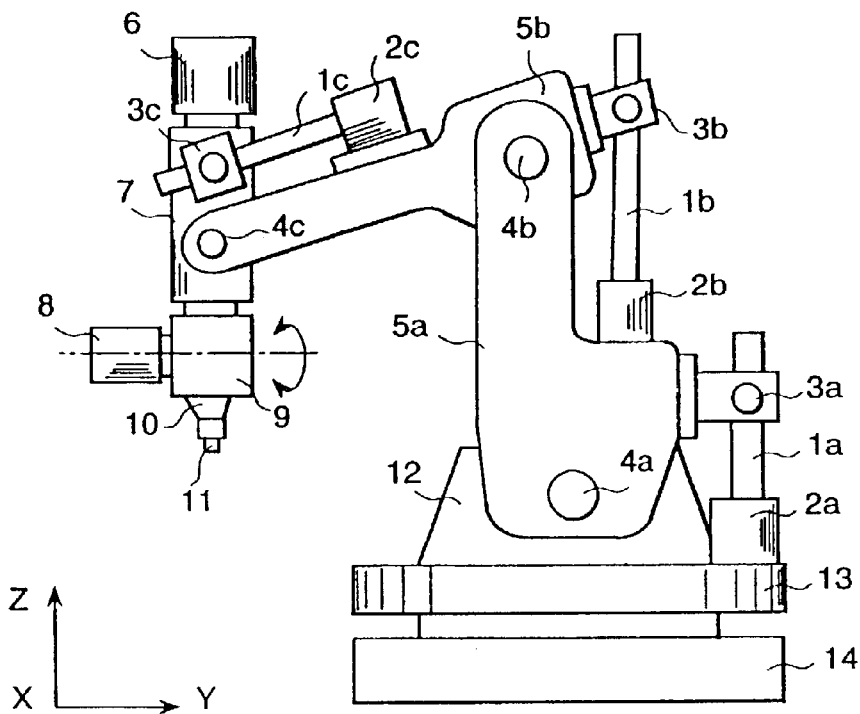
FIG. 1 is an entire configuration diagram of a friction stir welding apparatus according to the present invention.

FIG. 1 is an entire block diagram showing an example of a friction stir welding apparatus according to the present invention. The numerals 1a, 1b and 1c denote ball screws, numerals 2a, 2b and 2c denote servo motors, numerals 3a, 3b and 3c denote bearings, numerals 4a, 4b and 4c denote link pins, numerals 5a and 5b denote second and first arms, respectively, numeral 6 denotes a main spindle rotating motor, numeral 7 denotes a pivoting member, numeral 8 denotes a bending drive member, numeral 9 denotes a rotational axis bending member, numeral 10 denotes a chucking member, numerals 11, 11a and 11b denote rotating tools, numeral 12 denotes a support base, numeral 13 denotes a rotary table, and numeral 14 denotes an apparatus base.

The second and first arms 5a, 5b are pivotable about the link pins 4a and 4b, respectively, as fulcrums. The main spindle rotating motor 6 and the rotating tool 11 are mounted to a distal end of the first arm 5b and can be moved to desired positions by pivotal movements of the second and first arms 5a, 5b. The whole of the portion located above the support base 12 is rotated with rotation of the rotary table 13.

The ball screws 1a and 1b are rotated by operation of the servo motors 2a and 2b, and with this rotation, the distances between the bearings 3a, 3b and the servo motors 2a, 2b change, the second arm 5a moves right and left, and the rotating tool 11, which is connected to the first arm 5b through the link pin 4c, moves vertically.

The ball screw 1c is rotated by operation of the servo motor 2c, and with this rotation, the distance between the bearing 3c and the servo motor 2c changes, the rotating tool 11 pivots right and left with the link pin 4c as a fulcrum, and the main spindle rotating motor 6, pivoting member 7, rotational axis bending member 9 and bending drive means 8 rotate integrally. The pivoting member 7 can rotate in both right and left directions independently on the same axis as a rotational axis of the rotating tool 11 and is received and fixed into another member with the link pin 4c as a fulcrum.

Figure 2:
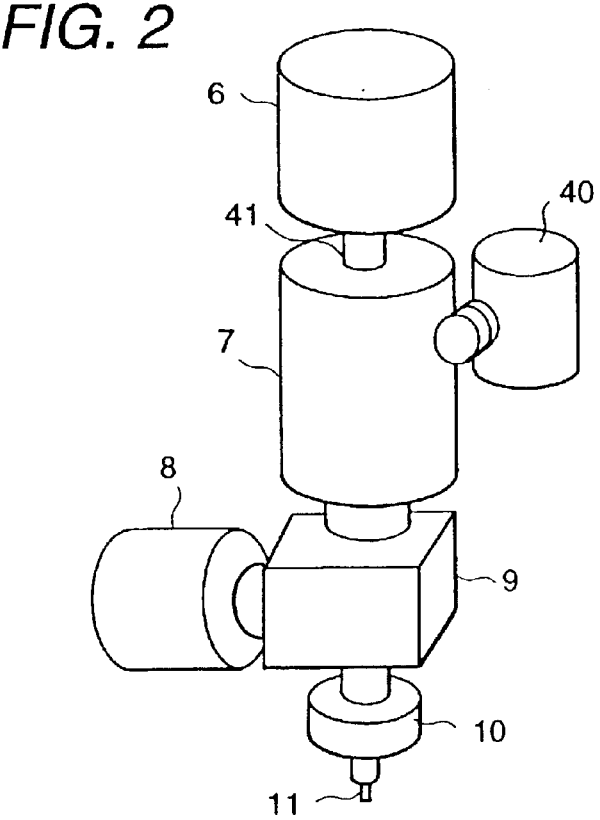
FIG. 2 is a conceptual diagram showing an entire configuration of a rotating tool assembly used in the present invention.
Figure 3:
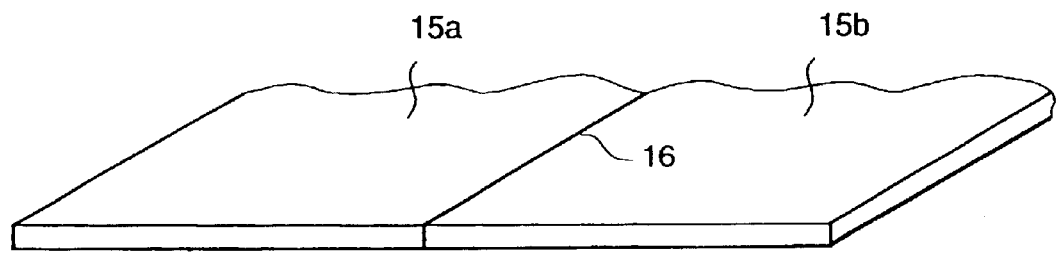
FIG. 3 is a configuration diagram showing a flat plates butt welding.
Figure 4:
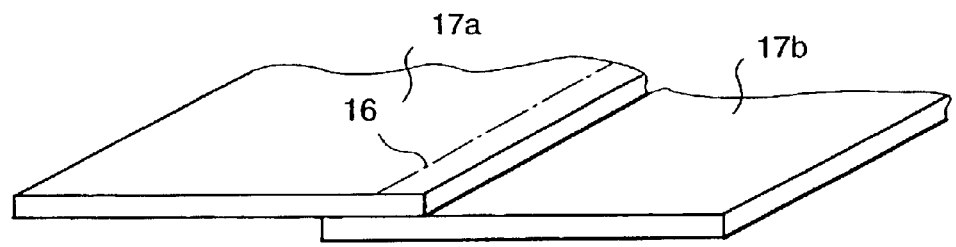
FIG. 4 is a configuration diagram showing a flat plates lap welding.
Figure 5:
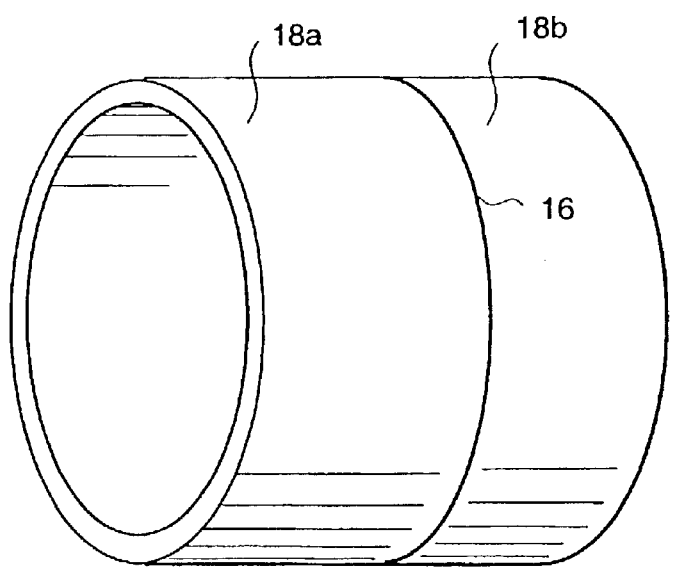
FIG. 5 is a configuration diagram showing welding of cylindrical members.
Figure 6:
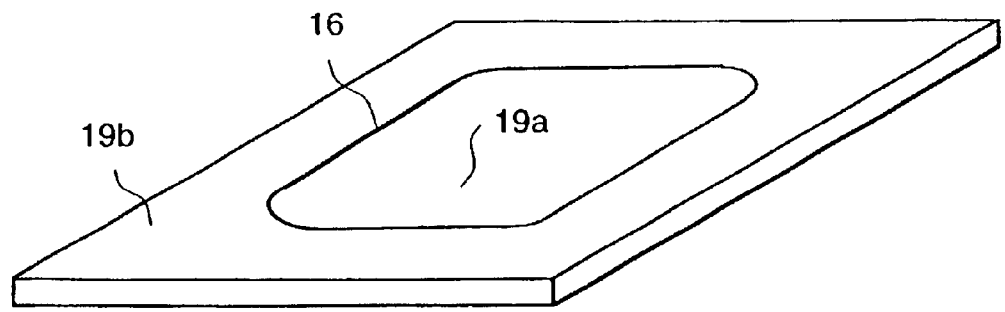
FIG. 6 is a configuration diagram showing welding of flat plates which is performed along a rectangular joint line.
Figure 7:
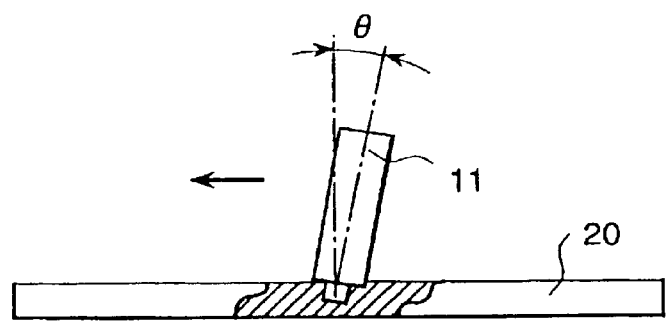
FIG. 7 is a configuration diagram showing a positional relation between workpieces and a rotating tool.
Figure 7:
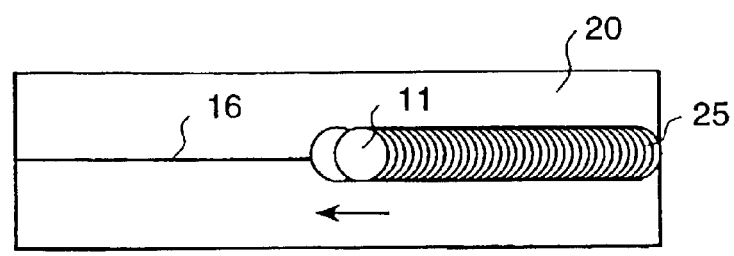
Figure 8:
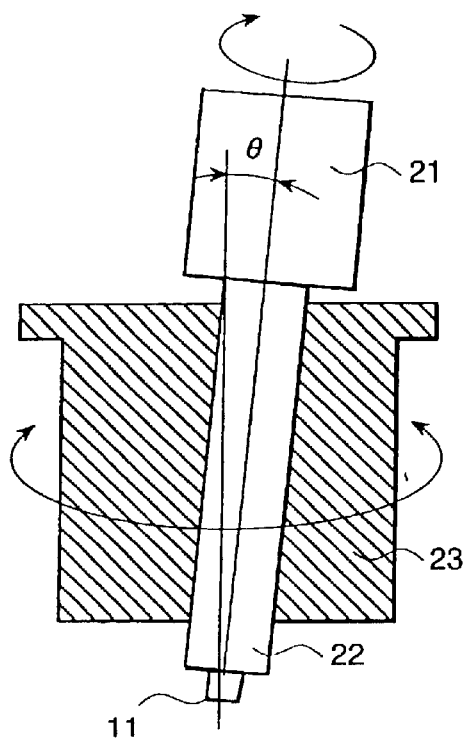
FIG. 8 is a configuration diagram of a rotating tool used in a conventional apparatus.
Figure 9:
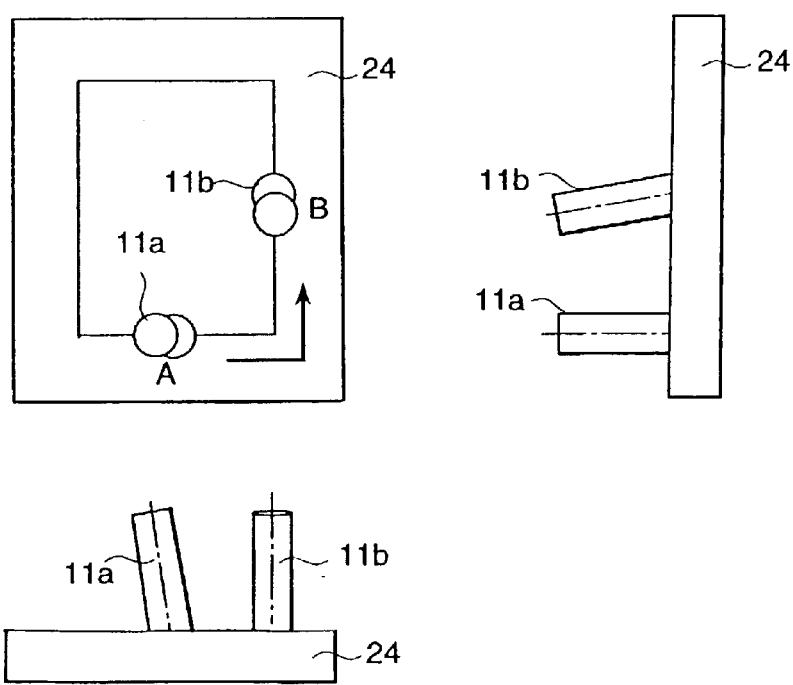
FIG. 9 is a configuration diagram showing a positional relation between workpieces and a rotating tool in flat plates welding performed along a rectangular joint line.

FIG. 2 is a perspective view of a rotating tool assembly which causes the rotating tool 11 to bend and rotate. The rotating tool 11 is bent and rotated by the rotational axis bending member 9. With rotation of the rotating tool 11 through the pivoting member 7 the rotational axis bending member 9 is rotated together with the rotation of the rotating tool 10 by the rotation of the bending drive means 8 in a direction different 90°, i.e., in an orthogonal direction, relative to the aforesaid pivotal rotation.

The rotational axis bending member 9 comprises a bevel gear mounted on a rotating tool-side end of a transfer member 41 which is for the transfer of rotation from the main spindle rotating motor 6 for the rotating tool 11, a bevel gear which is for the transfer of rotation from the bending drive means 8, and a bevel gear which transmits a driving force from the bevel gear just mentioned to the rotating tool 11 and which is mounted on rotational axis bending member 9 side of the rotating tool. By means of these bevel gears an angle of insertion of the rotating tool 11 relative to workpieces is changed in all directions. 190° or less is allowable for the rotational angle of the rotational axis bending member 9 as its configuration. The combination of these bevel gears function to effect both rotation of the rotating tool 11 from the main shaft rotating motor and bent rotation of the rotating tool.

The pivoting member 7 is composed of a worm gear for the transfer of driving force from a pivoting drive means 40 and a worm wheel gear for pivoting driving force provided from the worm gear. The pivotal motion causes the rotating tool 11 to rotate while being bent. In this connection, the angle of insertion of the rotating tool 11 is changed by the combination of the bevel gear connected to the main spindle rotating motor 6, the bevel gear connected to the rotating tool 11 side and the bevel gear connected to the bending drive means 8 side. The rotational axis bending member 9 constituted by such connections of the three bevel gears and the pivoting member 7 are coupled integrally. The combination of these two rotations orthogonal to each other permits any curved surfaces in three dimensions to be joined together in angles and directions which are best suited for the curved surfaces. The total pivoting angle is 370°.

The friction stir welding apparatus of this embodiment, which joins workpieces by pushing the rotating tool 11 into workpieces under rotation of the rotating tool and moving it along a joint line, is provided with the main spindle rotating motor 6 serving as a drive means for rotating the rotating tool 11, a pivoting drive means which transmits power from the main spindle rotating motor 6 to the rotating tool 11 through the pivoting member 7 and which causes both main spindle rotating motor 6 and rotating tool 11 to pivot about a fulcrum provided in the pivoting member 7, the bending drive means 8 which causes the rotating tool 11 to rotate through the rotational axis bending means 9 in a direction different 90° from the direction of rotation induced by the pivoting drive means, the first arm 5b which supports the pivoting member at a fulcrum, a drive means which actuates the fulcrum side of the first arm vertically, the second arm 5a which supports the first arm 5b, a drive means which causes the first arm 5b side of the second arm 5a to rotate, the support base 12 which fixes the second arm 5a, and the rotary table 13 which supports the support base 12 rotatably.

As is seen from the above embodiment, the rotating tool 11 has two rotational axes formed rotatably in orthogonal directions different 90° from each other on the basis of both a normal line direction relative to joint surfaces of workpieces and a tangential direction of a joint line. Workpieces can be joined while setting rotational angles of the rotational axes respectively, thus permitting easy welding for three-dimensional curved surfaces.

(Second Embodiment)

Figure 10:
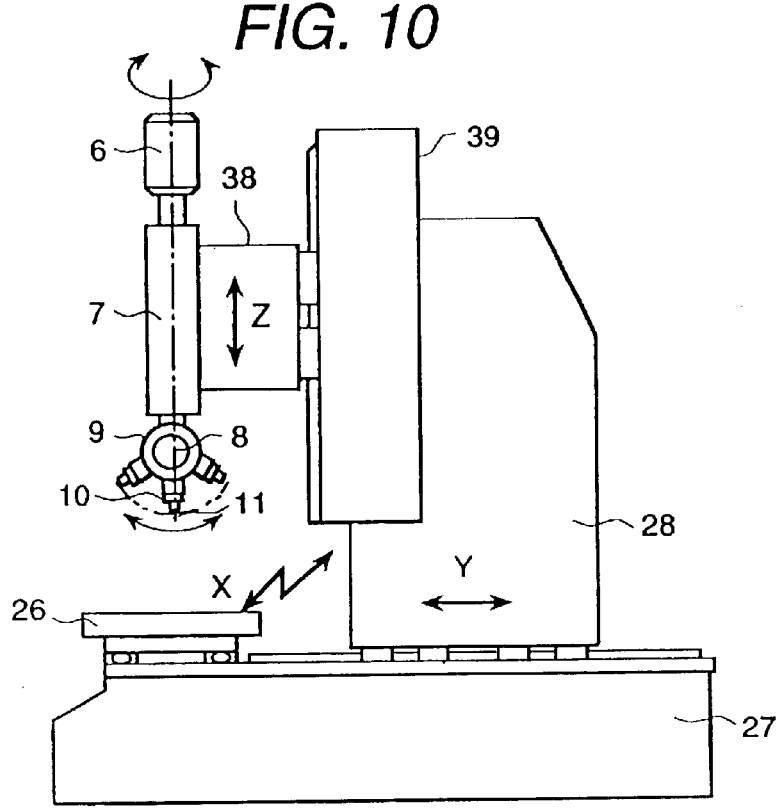
FIG. 10 is an entire configuration diagram of a friction stir welding apparatus according to the present invention.
Figure 11:
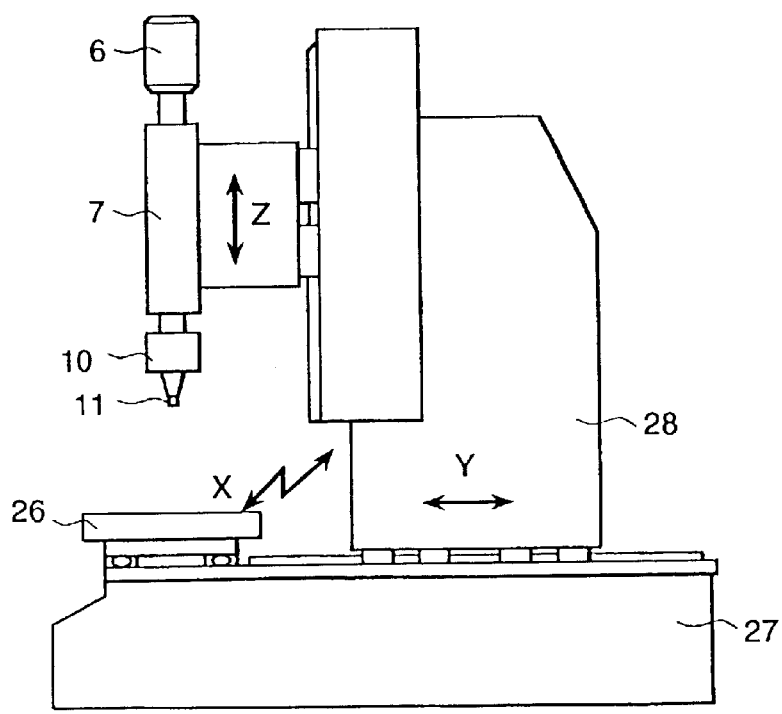
FIG. 11 illustrates the whole of a friction stir welding apparatus as a comparative example.

FIG. 10 is an entire configuration diagram showing another example of a friction stir welding apparatus according to the present invention, in which the numeral 28 denotes a column, numeral 27 denotes an apparatus base, and numeral 26 denotes a workpiece mount.

In the same figure, the directions (X, Y, Z) indicated with both-end arrows are moving axis directions, which are orthogonal to one another. A main spindle rotating motor 6, pivoting member 7, bending drive member 8, rotational axis bending member 9, chucking member 10, and rotating tool 11 are mounted to a member adapted to move in Z-axis direction. All of these components move with motion of the Z axis.

With a driving force from a servo motor, the pivoting member 7 pivots about an axis parallel to the Z axis though not shown. The total pivoting angle is 370° as is the case with the previous embodiment.

With the bending drive member 8, the direction of the rotational axis of the rotating tool 11 changes from the portion of the bending drive member 8 so as to rotate in at an angle different 90° relative to the rotation of the pivoting member 7. The bending operation of the bending drive member 8 is performed using a servo motor through a reduction mechanism (a harmonic drive) of a high reduction ratio, though not shown. The use of a harmonic drive permits the use of a small-sized motor and hence permits the reduction in size of the tip end portion extending from the bending drive member 8 up to the rotating tool 11. The angle of bending by the bending drive member 8 can be set at ±100° with respect to a rotational axis of the main spindle rotating motor 6.

By allowing the pivoting member 7 to pivot in a bent state of a rotational axis of the rotating tool 11 by means of the bending drive member 8, the rotating tool 11 can be inserted into workpieces while adding an attack angle in a normal line direction or to a normal line with respect to various portions on arbitrary curved surfaces of the workpieces.

Also in this embodiment there is used the same configuration as in the previous embodiment, whereby the pivoting member 7 can be pivoted in a bent state of the rotational axis of the rotating member 11 by the bending drive member 8. By a bending angle—pivoting angle combination the rotating tool 11 can be set in a normal line direction for the whole surface of a hemisphere.

The rotating tool 11 is formed using a material substantially harder than the material of workpieces. As the material of the rotating tool 11 there may be used a metal as a typical example. In the present invention there was used a material obtained by heat-treating a tool steel. Ceramics and surface-hardened materials are also employable if only they satisfy requirements for toughness and heat resistance in addition to the required hardness.

In a plane including a joint line and a normal line of workpieces the rotational axis of the rotating tool 11 may be tilted at a predetermined angle (attack angle) backward in the welding direction relative to the normal line. The attack angle is, say, 3° to 10°, of which 3° is adopted in this embodiment.

The friction stir welding apparatus of this embodiment, which joins the workpieces by pushing the rotating tool 11 into the workpieces under rotation of the rotating tool and moving the rotating tool along a joint line, is provided with a pivoting drive means 38 which causes the portion from the main spindle rotating motor 6 up to the tip end of the rotating tool to rotate, the motor 6 serving as a drive means for rotating the rotating tool 11, the bending drive means 8 which causes the rotating tool 11 to rotate through the rotational axis bending member 9 in a direction different 90° from the direction of rotation induced by the pivoting drive means 38, a first holding means 38 which holds the rotational axis bending member 9 at a fulcrum, a second holding means 39 which holds the first holding means 38 vertically movably, the column 28 which holds the second holding means 39, the apparatus base 27 which holds the column 28 horizontally movably, and the workpiece mount 26 which is mounted on the apparatus base 27 and which is movable horizontally in a direction different 90° from the moving direction of the column 28.

In the apparatus of this embodiment described above, the rotating tool 11 has two rotational axes formed rotatably in directions different 90° from each other on the basis of a normal line direction with respect to joint surfaces of the workpieces and a tangential direction of the joint line, and the workpieces can be joined while setting rotational angles of the rotational axes, whereby a three-dimensional welding can be effected easily.

(Third Embodiment)

Figure 12:
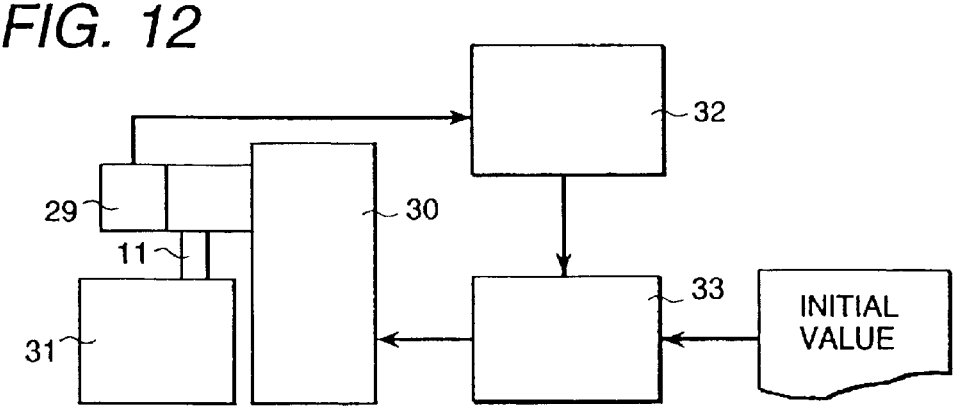
FIG. 12 is a system block diagram of a friction stir welding apparatus including an arithmetic unit and a control unit.

FIG. 12 is a conceptual diagram showing a system configuration of a friction stir welding apparatus according to the present invention, in which the numeral 29 denotes a sensor, numeral 30 denotes the friction stir welding apparatus, numeral 31 denotes a workpiece, numeral 32 denotes an arithmetic unit, and numeral 33 denotes a control unit.

A coordinate value calculated from the shape of workpiece before the start of welding, a normal line direction of a joint region, and a tangential direction of a joint line are inputted as initial values to the control unit 33.

The friction stir welding apparatus 30 starts welding on the basis of the initial values. At the same time, the sensor 29 detects a positional relation between a rotating tool 11 and the workpieces 31 and inputs the result of the detection to the arithmetic unit 32. The arithmetic unit 32 collates the detection result with the initial values and inputs amendment values based on a deviation of the two to the control unit 33. Through these flows the welding proceeds while the initial values are amended in various portions of the joint region.

The arithmetic unit 32 and the control unit 33 are illustrated as separate components in FIG. 12, but in this embodiment both are installed within a single personal computer.

In this embodiment, welding can be performed while allowing a movement path of the rotating tool 11 to be shifted on the basis of a preset joint line and while detecting a relation between the position of a joint line during welding and the position of a tip end of the rotating tool 11 by the sensor 29 and amending the detected value.

Further, welding can be done while detecting the position of a joint line at a preceding position in the advancing direction of the rotating tool 11 by the sensor 29 and while amending the position of the tip end of the rotating tool 11 during welding on the basis of the detected position.

(Fourth Embodiment)

Figure 13:
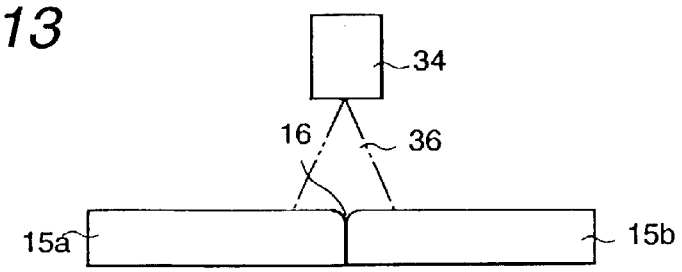
FIG. 13 is a configuration diagram showing a relation between workpieces and a sensor detection range in butt welding.
Figure 14:
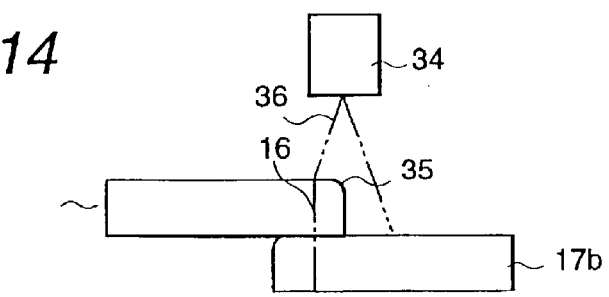
FIG. 14 is a configuration diagram showing a relation between workpieces and a sensor detection range in lap welding.
Figure 15:
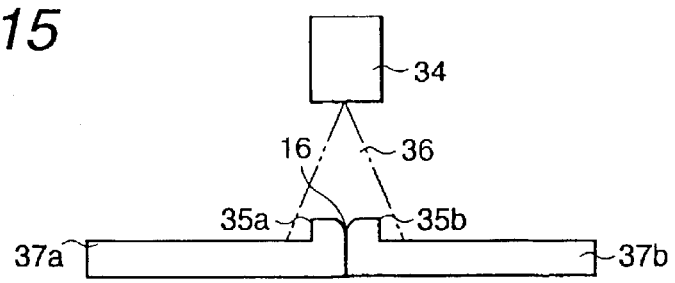
FIG. 15 is a configuration diagram showing a relation between workpieces with projections and a sensor detection range.

FIGS. 13 to 15 are conceptual diagrams showing states in which joint regions are measured by a method according to the present invention using the apparatus of the first to the third embodiment. In these Figures, the numeral 16 denotes a joint line, numeral 34 denotes a wide angle region measuring type laser displacement meter, numerals 35, 35a and 35b denote edge portions of workpieces, and numeral 36 denotes a measurement region. FIG. 13 illustrates butt welding of flat plates, FIG. 14 illustrates lap welding of flat plates, and FIG. 15 illustrates welding of workpieces formed with projections.

In FIG. 13, laser beam is radiated from the wide angle region measuring type laser displacement meter 34 so that the joint line 16 is located within the measurement region 36, and the joint line 16 is identified from the measured value. Edges of workpieces 15a and 15b are rounded, which is unavoidable in the manufacturing process. When the workpieces are abutted against each other, the round edges define a recess like a groove in the abutted region. In the example shown in FIG. 13, the said recess is identified to identify the joint line 16.

In FIG. 14, a joint line 16 lies on smooth surfaces of workpieces and therefore it is difficult to directly identify the position of the joint line 16. However, if a workpiece 17a is positioned so that an edge portion 35 thereof is within the measurement region 36 of the laser displacement meter 34, it is possible to identify the position of the edge portion 35 and calculate the joint line on the basis of the edge position.

In the case of such workpieces formed with projections as in FIG. 15, both of the above methods are applicable. One may be selected according to a finished state of workpieces 37a and 37b.

In this embodiment the position of a groove formed between workpieces or the position of edge portions at ends of the workpieces is detected and the position of the rotating tool 11 in the width direction of the joint line can be amended on the basis of the detected position of the groove or of the edges.

What is claimed is:

1. A friction stir welding method of joining workpieces by pushing a rotating tool into the workpieces under rotation of the rotating tool and moving the rotating tool along a joint line, characterized in that the workpieces are joined together while setting a posture of the rotating tool to be pushed into the workpieces with use of both a member having the same rotational axis as a rotational axis of said rotating tool and capable of rotating independently of the rotation of said rotating tool and a member capable of deflecting the rotational axis of the rotating tool about an axis which intersects or perpendicularly intersects the rotational axis of the rotating tool.

2. A friction stir welding method of joining workpieces by pushing a rotating tool into the workpieces under rotation of the rotating tool and moving the rotating tool along a joint line, characterized in that said rotating tool has two rotational axes rotatable independently of the rotation of the rotating tool and in directions in which said rotational axes intersect or perpendicularly intersect each other, and the workpieces are joined together while setting rotational angles of said two rotational axes with respect to the rotating tool.

3. A friction stir welding method of joining workpieces by pushing a rotating tool into the workpieces under rotation of the rotating tool and moving the rotating tool along a joint line, characterized in that a normal line direction of the workpieces with respect to joint surfaces of the workpieces and a tangential direction of the joint line are detected, and said rotating tool is moved in three-dimensional directions to join the workpieces while setting, on the basis of the detected normal line direction and tangential direction, an angle of a tip end of the rotating tool with respect to said normal line direction or an angle at which the rotating tool is pushed into the workpieces, as well as a moving direction of the rotating tool with respect to said tangential direction.

4. A friction stir welding method according to any of claims 1 to 3, wherein a positional relation between the position of the joint line and the tip end of said rotating tool is set beforehand, and the workpieces are joined together while amending the preset positional relation and a positional relation during welding in a successive manner.

5. A friction stir welding method according to any of claim 4, wherein the position of said joint line is detected at preceding position with respect to an advancing direction of said rotating tool, and the workpieces are joined together while amending the position of the tip end of the rotating tool during welding on the basis of the detected position.

6. A friction stir welding method according to any of claim 5, wherein the position of a groove portion between the workpieces or the position of edges of end portions of the workpieces is detected, and the position of said rotating tool in the width direction of said joint line is amended on the basis of said groove portion or said edges.

* * * * *